(12) United States Patent
Boritzki

(10) Patent No.: US 6,237,816 B1
(45) Date of Patent: May 29, 2001

(54) ROTARY VALVE AND METHOD OF OPERATING IT

(75) Inventor: Jörg Boritzki, Königseggwald (DE)

(73) Assignee: Coperion Waeschle GmbH & Co. KG, Weingarten (DE)

( * ) Notice: Subject to any disclaimer, the term of this patent is extended or adjusted under 35 U.S.C. 154(b) by 0 days.

(21) Appl. No.: 09/629,626

(22) Filed: Jul. 31, 2000

(30) Foreign Application Priority Data

Jul. 31, 1999 (DE) .............................................. 199 36 136

(51) Int. Cl.[7] .................................................... G01F 11/10
(52) U.S. Cl. ................................................. 222/368; 222/1
(58) Field of Search .................................. 222/368, 313, 222/315, 317, 185, 260

(56) References Cited

U.S. PATENT DOCUMENTS

| | | | |
|---|---|---|---|
| 2,475,381 | * 7/1949 | Erickson | 222/1 |
| 3,606,965 | * 9/1971 | Cortelyou et al. | 222/368 |
| 3,758,004 | * 9/1973 | Garrett et al. | 222/368 |
| 4,511,067 | * 4/1985 | Martin et al. | 222/368 |
| 5,024,356 | * 6/1991 | Gerling et al. | 222/313 |

FOREIGN PATENT DOCUMENTS

| | | |
|---|---|---|
| 279 482 | 3/1970 | (DE). |
| 23 39 135 | 2/1975 | (DE). |
| 298 19 747 | 4/1999 | (DE). |
| 0 732 280 | 3/1995 | (EP). |

* cited by examiner

Primary Examiner—Philippe Depakshani
Assistant Examiner—Thach H Bui
(74) Attorney, Agent, or Firm—Burns, Doane, Swecker & Mathis, LLP

(57) ABSTRACT

A rotary valve for feeding bulk material comprises a housing having a cavity, a supply opening leading to said cavity, and a discharge opening. Within the cavity, there is a cellular wheel rotatably supported. The distance between the outer circumference of the cellular wheel and the inner wall of the cavity can be altered. At least one sensor determines the distance and provides an output signal representative for it. Either the cellular wheel or the inner wall of the cavity or both are at least locally deformable in dependence on the output signal. In addition, the invention relates to a method or operating a cellular wheel where the above-mentioned distance or gap is determined or measured and at least one of said inner and outer radial dimensions of the cellular wheel and the cavity are controlled accordingly.

16 Claims, 7 Drawing Sheets

ROTARY VALVE AND METHOD OF OPERATING IT

This application claims priority under 35 U.S.C. §§119 and/or 365 to 199 36 136.3 filed in Germany on Jul. 31, 1999; the entire content of which is hereby incorporated by reference.

FIELD OF THE INVENTION

The present invention relates to a rotary valve for feeding bulk material, comprising a housing having a cavity. The cavity is defined by an inner wall of at least partially circular cross-section along a central axis, and a supply opening leading to said cavity, and a discharge opening. A cellular wheel is rotatably supported about an axis of rotation in the cavity and includes a plurality of cells distributed around the axis and defined by partitions which extend in radial direction of the cellular wheel. The present invention is also concerned with a method of operating a rotary wheel.

BACKGROUND OF THE INVENTION

Rotary valves of this kind are usually used for conveying or metering bulk material. A cellular wheel is rotatably supported in the cavity and includes a plurality of cells which are charged with bulk material from above through the supply opening of the housing. The supply opening or shaft may be in communication with a vessel, such as a storage bin. When the cellular wheel rotates, the bulk material is introduced through the discharge opening, for example, into a pneumatic conveyor conduit where it is conveyed by a gas under pressure to a desired location.

Since ordinarily the bin is under a smaller gas pressure than the pneumatic conveyor conduit, it is usual to make the cellular tightly sealed or fitting in the housing's cavity. However, when defining the dimensions it has to be taken into account that the cellular wheel may be radially shifted by a small amount due to the difference in pressure between the discharge opening and the supply opening.

Furthermore, when the gas under pressure streams from the conveying conduit and the discharged cells upwards, this results in local cooling and, thus, a distortion which reduces the inner dimensions of the cavity. Likewise, when hot bulk material is conveyed, the cavity may experience a certain expansion, thus enlarging its inner dimensions. In all these cases, the distance between the outer circumference of the cellular wheel and the inner dimensions of the cavity will no longer be maintained in the desired range or at a certain nominal value desired.

A rotary valve of the type described at the outset is known from EP 0 732 280 A1 the disclosure of which is hereby incorporated by reference in its entirety. In this document, a rotary valve is described having a conical cellular wheel in a fitting cavity so that the distance or gap between the outer radial dimensions or periphery of the cellular wheel and the inner radial dimensions of the cavity may be adjusted by shifting the cellular wheel in axial direction in the cavity. There is a shifting drive for the cellular wheel and a control unit which maintains this gap automatically at the smallest possible value for enabling, nevertheless, rotation of the wheel. The shifting drive is periodically operated by the control unit for re-reducing the gap when it has become larger due to wear. To determine this fact, the drive torque necessary to rotate the cellular wheel is measured. If the drive torque reaches a pre-adjusted maximum value due to increasing friction when shifting the conical cellular wheel in the hollow conical cavity, the cellular wheel is shifted back by a well-defined stroke in axial direction to enable proper rotation so that the value of the gap will finally be reduced to a desired nominal value of 0.1 mm, for example.

This procedure involves, however, various disadvantages. First, this procedure can only be applied to rotary valves having a conical cellular wheel, because axially shifting a cylindrical wheel in a cylindrical cavity would not alter the gap between them. Second, the procedure means that the cellular wheel and the inner wall of the cavity may contact each other, which may destroy their surfaces when they are made of sensitive materials, for example, if they are both made of special steel.

Document DE 298 19 747 U1 the disclosure of which is hereby incorporated by reference in its entirety discloses locally influencing the radial dimensions of a cavity by locally heating the housing. By heating the housing, reduction of the inner diameter of the cavity shall be prevented which is due to the flash of conveying gas when leakage gas from the rotary valves escapes, thus provoking cooling both of the gas and the housing. The actual gap width or distance between the outer radial dimensions of the cellular wheel and the inner radial dimensions of the cavity is not determined neither indirectly nor directly.

Furthermore, it is known from German Publication No. DE-A-2,339,135, the disclosure if which is hereby incorparated by reference in its entirety, to change the diameter of a cellular wheel by inflating special hose-like elements which are arranged radially outside on the partitions When the rotary valves is stopped, the outer radial dimensions of the cellular wheel are enlarged so that it sealingly engages the inner wall of the cavity. In this way, the use of any additional sliding valve as a shutter can be avoided. Before operating the rotary valve, the hose-like seals are biased by pressurized air so that they may disengage the inner wall of the cavity due to their special shape.

Another rotary valve of the type described at the outset is disclosed in Austrian Patent (AT) No. 279 482 the disclosure of which is hereby incorparate by reference in its entirety. According to this document, the cavity is provided with a deformable, hose-like inner lining of rubber or an elastomer which is pressed in radial direction against the circumference of the cellular wheel to engage tightly the partitions by supplying a pressure medium into a gap between the housing and the inner lining.

However, it is not acceptable or even permissible that the partitions of the cellular wheel and the stationary walls of the housing contact each other if they are made of metal.

SUMMARY OF THE INVENTION

It is an object of the present invention to reduce the distance, and particularly the radial distance, or the gap between the cellular wheel and the inner wall of the cavity to the smallest possible value, and this in any condition, even when the rotary valve stops or begins to operate. Any contact of their surfaces should be avoided. This applies particularly to the radial dimensions which are especially liable to changes, but in certain cases it may also concern the axial dimensions, e.g. in a rotary valve having a vertical axis and supplying the bulk material from the top to be discharged at the bottom.

This object is achieved according to the invention in that at least one measuring device for determining the distance between the radial (or axial) outer dimension of the cellular wheel and the radial (or axial) inner dimension of the cavity is provided giving an output signal which is representative for this distance, and that an adapting device receives this output signal for controlling and maintaining the distance substantially constant at least locally.

Adapting by corresponding deforming is preferably done by local or total tempering, i.e. cooling or heating according to the requirements, either of the cellular wheel or the housing or both.

According to a further embodiment of the invention, there is at least one hollow space either in the partitions (or part of them) or in the inner wall of the cavity, and a pressure medium is supplied to this hollow space for deforming at least one of either the partition means and/or the inner wall. This may either be done in the customary way by using an elastic wall facing the gap between cellular wheel and cavity directly. This means that the pressure medium inflates this elastic wall, and thus adjusts the gap. However, it should be noted that deformation, within the scope of the present invention, could also be effected in the way known from rollers having an adjustable crowning. In such a case, a plurality of actuable punch presses (e.g. hydraulic cylinders) would be arranged behind a wall facing the gap between cellular wheel and cavity and press or withdraw it, as is known with paper calender rollers. A simplified form of such an arrangement will be described later with reference to FIG. 3.

Preferably, the cavity portion of the housing can be formed by an annularly configured sheet metal which is deformable by applying a force from outside, e.g. so as to become more or less elliptical.

Alternatively, it would be possible to subdivide the inner wall of the cavity into at least two partial walls displaceable or shiftable relative to each other. The housing may be formed according to a particular embodiment of the invention in the form of at least one (or more) sheet metal having two ends displaceable in the direction of the circumference of the cavity so as to change the circumferential dimension. A further alternative resides in that there is at least one deformable element between an outer wall of the housing and its inner wall which faces the cavity.

According to the invention, a rotary valve is operated in that the radial distance between the radially outer dimension of the cellular wheel and the inner radial dimension of the cavity is determined, and at least one of said inner and outer radial dimensions is controlled. The term "determining", in the context of the present specification, should mean measuring either directly or indirectly. Theoretically, it could be even done by using a mathematical model for determining the actual gap or distance.

Measuring can preferably be effected inductively, i.e. using at least one induction coil (or a capacitor), or employing at least one contacting sensor which may, for example, include a single sensor pin whose length outside the housing is a measure for the gap inside. Alternatively, this length is measured again, either inductively or by a change of a capacitance. According to a further alternative, at least two sensors could be used which are electrically conductive when both engage the cellular wheel (or the inner wall of the cavity), but interrupt a circuit as soon as they lose contact.

BRIEF DESCRIPTION OF THE DRAWINGS

The above objects and feature of the present invention will be more apparent from the following description of the preferred embodiments with reference to the accompanying drawings, wherein.

DETAILED DESCRIPTION OF THE DRAWINGS

Figure 1:
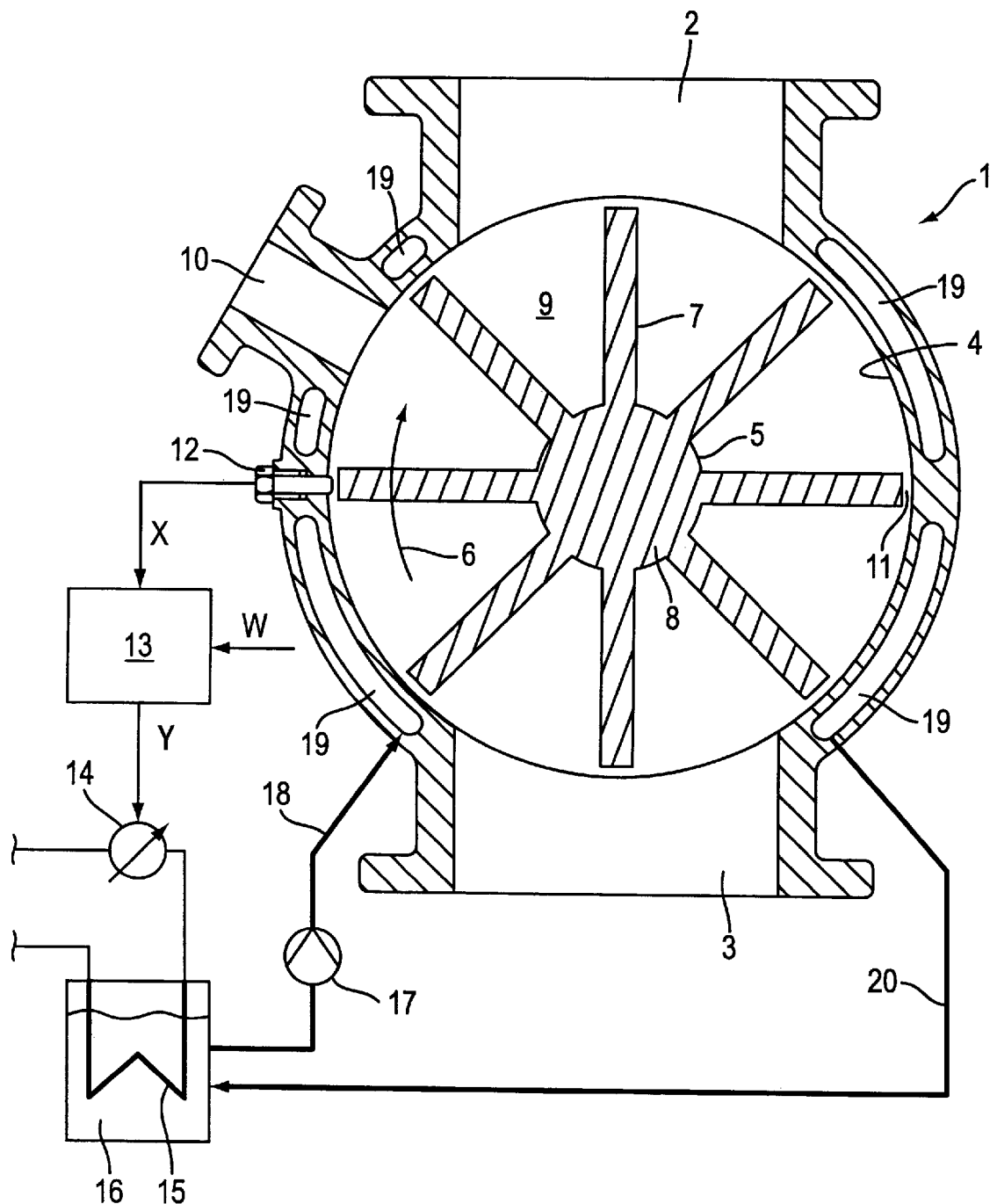
FIG. 1 illustrates a cross-sectional view of a rotary valve according to the present invention.

A rotary valve, as shown in FIG. 1, comprises a housing 1 which includes a supply opening or shaft 2 and a discharge opening or shaft 3 for conveying bulk material through the rotary valve. The supply opening 2 can, for example, be connected to a bin filled with bulk material, while the discharge opening preferably, but not necessarily, opens into a pneumatic conveyor conduit. A cavity 4 within the housing 1 is defined at least over part of its circumference by a substantially cylindrical inner wall and contains a cellular wheel 5 which is supported as to be rotated in the sense of arrow 6. The cellular wheel 5 is provided with a plurality of, preferably equally distributed and spaced, partitions 7 which extend in radial direction and towards the inner wall of the cavity 4 from a shaft 8 of the cellular wheel 5. These partitions define individual cells 9 which receive bulk material when they are aligned with the supply opening 2 during rotation of the wheel 5, and they deliver this bulk material to the discharge opening 3. As a counter-move, the cells 9 may receive a certain amount of conveying gas under pressure from the discharge opening 3 (if it is under a pneumatic overpressure). This gas is flashed through a vent 10 prior to reaching the supply opening 2 to adopt approximately the pressure prevailing in the supply opening which will, ordinarily, be atmospheric pressure. In order to minimize the leakage flow of gas under pressure from the discharge opening 3 to the supply opening 2, the cellular wheel 5 is fitted into the cavity 4 leaving a very small distance or gap in-between so that such narrow gaps 11 between the partitions 7 and the cavity 4 of the housing 1 amount to a few tenth of a millimeter and form a high resistance against any gas flow.

In the housing 1, according to FIG. 1, is an inductive sensor 12 by which the distance or gap 11 between the inner wall of the cavity, to which it is fixed, and the partitions 7 passing it can be measured. It is clear that each partition 7 will cause an electric pulse as an output signal when the cellular wheel is rotated. The amplitude of this pulse is a measure X of the gap 11. This measure X of the gap 11 to be controlled is compared in a comparator stage 13 with a nominal value W which, for example, corresponds to a minimum safety clearance between the cellular wheel 5 and the inner wall of the cavity 4 which is imperative even with controlling the gap 11. The comparator stage 13, depending on a difference between the measured actual value and the desired or adjusted nominal value, may produce a control signal Y to a potentiometer 14 by which the heating power of an electrical heating coil 15 may be modified. In the present embodiment, the heating coil 15, instead of heating the inner wall of the cavity 4 directly, supplies heat to an oil bath 16. The, tempered and, in this case, heated oil is pumped from the oil bath 16 by means of a pump 17 and through a supply pipe 18 into communicating hollow spaces 19 within the housing 1 where the oil transfers heat to the housing 1. The oil flows then through a return pipe 20 back to the oil bath 16.

By tempering or heating the housing 1 entirely according to this embodiment, it will expand in radial direction. For example, if hot bulk material is conveyed by the rotary valve so that the cellular wheel 5 is heated when it begins to rotate and increases in diameter, the diameter of the cavity 4 can follow this increase. In this way, the cellular wheel 5 seals in an optimum way under any operational condition, i.e. also when stopped, without risking a contact between the cellular wheel 5 and its partitions 7, on the one hand, and the inner wall of the cavity 4 on the other hand. In the same way, any environmental influence, such as an air draw or a change of diameter due to a change of temperature, can be compensated by a corresponding change of the diameter of the cavity 4 so that the rotary valve is always as tightly sealed as possible and in an optimum way.

For some other applications, a cooling device, e.g. using an evaporating cooling agent, instead of the heating device (or in addition to it) could be used either in the oil bath 16 or directly in the hollow spaces 19. Moreover, it would be also possible to set the medium in the spaces 9 under pressure, for example by connecting them to the interior of a cylinder unit and shift a plunger in it (not shown).

Figure 2:
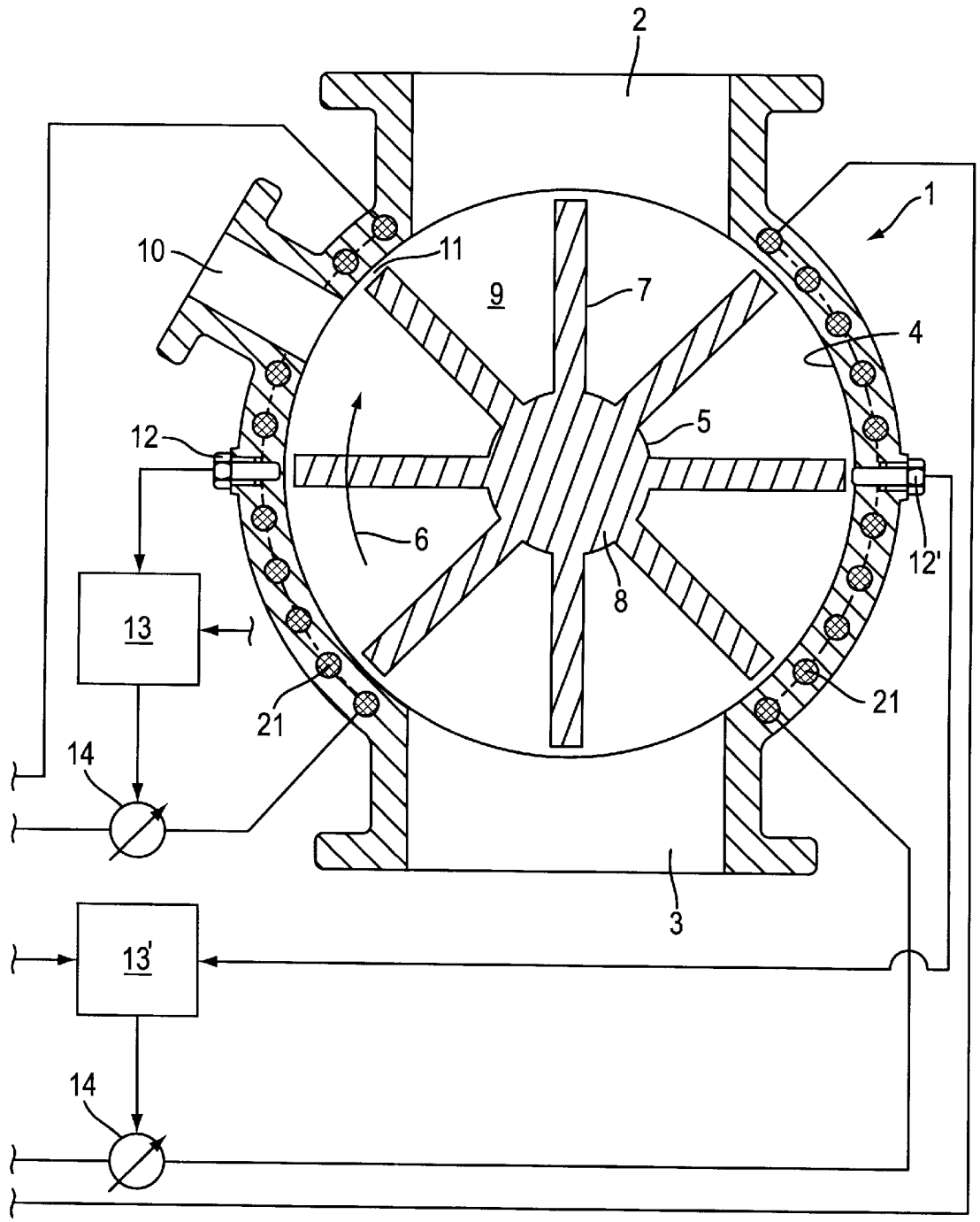
FIG. 2 depicts a further embodiment in a similar cross-section which comprises a tempering arrangement for controlling the distance or gap between cellular wheel and inner wall of the cavity by temperature dependent expansion and restriction.

The rotary valve according to FIG. 2 differs from the embodiment described above in that tempering is effected directly by electrical heating rods 21 inserted into the housing 1. Preferably, the heating power of the heating rods 21 is adjustable independently for those of the left side and those of the right side of FIG. 2, i.e. independently for the down-turning side of the rotating cellular wheel 5 and the up-turning side. The reason is that the right, down turning side of the cellular wheel 5 may be heated by hot bulk material, while the left, up-turning side is cooled by up-streaming leakage gas from the discharge opening 3. In order to be able to effect a separate control for the left and the right side, the gaps between the radial outer ends of the partitions 7 and the inner wall of the cavity are measured separately by two sensors 12 and 12' appropriately assigned to the left and right sides of the housing. The output signals of these sensors 12 and 12' are supplied to separate control stages or comparators 13 and 13'.

In this way, the cooling effect due to flashing of the gas under pressure in the range of the vent 10 can be compensated in a more favorable way in the left, up-turning side of the housing 1.

In the following figures which show further embodiments of rotary valves according to the present invention, the representation of the control circuits, as shown in FIGS. 1 and 2, is omitted.

Figure 3:
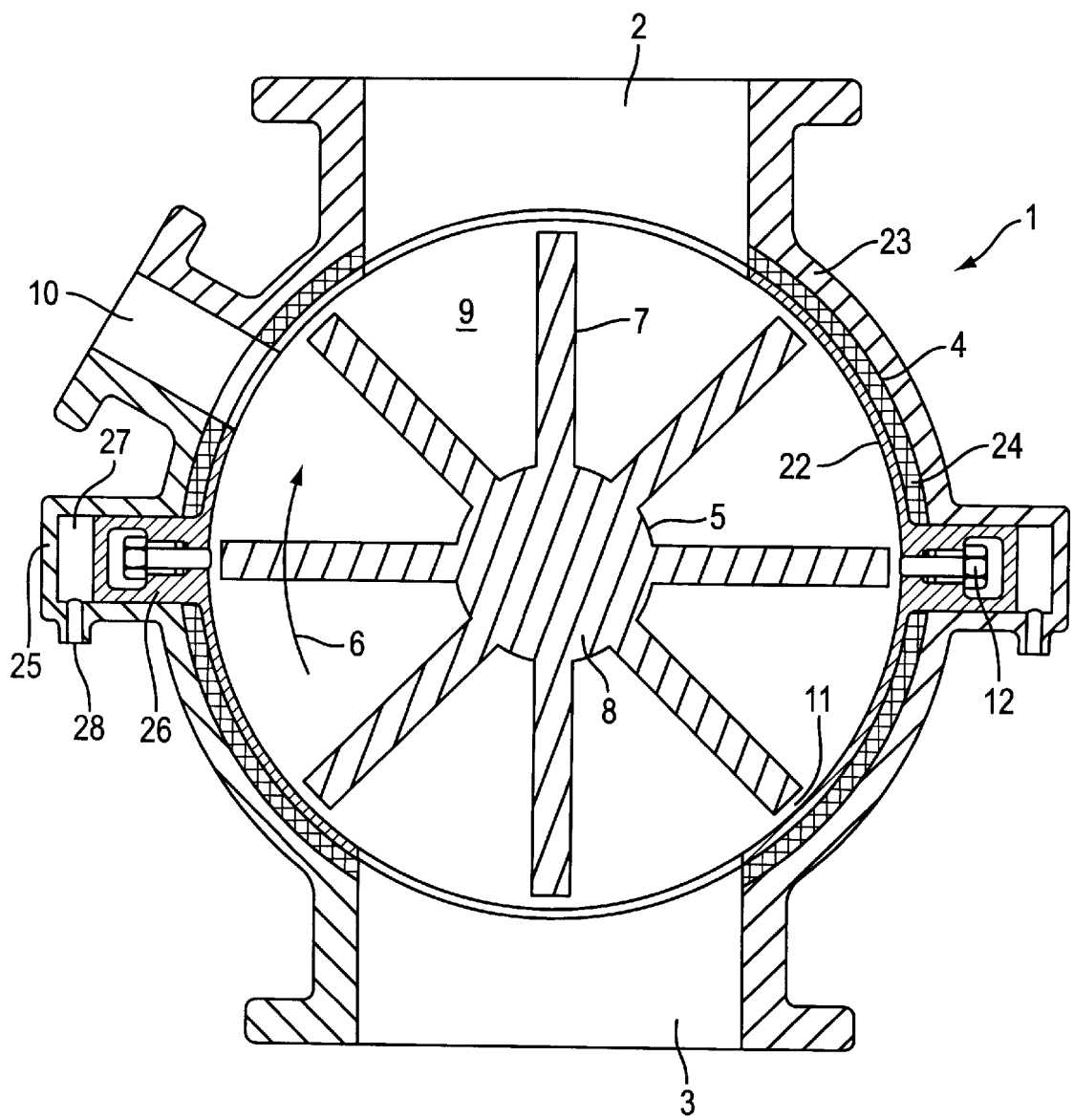
FIG. 3 represents a cross-section of a preferred embodiment wherein the inner wall of the cavity is formed by at least one metal sheet which is deformable under the action of a force applied to it.

The inner wall of the cavity 4 of the housing 1 of a rotary valve according to FIG. 3 is formed by a lining in the form of an annular sheet metal 22 spaced from a basic body 23 of the housing 1 by an elastic spacing layer or spacer 24. The sheet metal 22 is closed with exception of some cut outs in the region of the supply opening 2 and the discharge opening 3. The basic body 23 comprises lateral cylinders 25 (in the present embodiment only two) in which plungers 26, conveniently integrally formed with the annular sheet metal 22, are movable and define pressure spaces 27 together with the wall of the cylinders 25. If the pressure spaces 27 between the plungers 26 and the cylinders 25 are supplied with a pressure medium through a connecting socket 28, the inner wall 22 of the cavity 4 deforms to a substantially elliptic shape so that the distance of the circumference of the cellular wheel 5, i.e. from the free ends of the partitions 7, is reduced in some region, while being increased in another region. At those places where a minimum gap is striven for in order to attain a tight seal, the sensors 12 are located. In the embodiment shown, they are directly built into the plungers 26 by the displacement of which the radial dimension of the inner wall 22 of the cavity can be minimized. Although the diameter of the cavity increases in the region of the supply opening 2 and the discharge opening 3, this is harmless and has no negative influence with respect to the tightness of the rotary valve, because recesses of the cavity are necessary anyway at those places.

Figure 4:
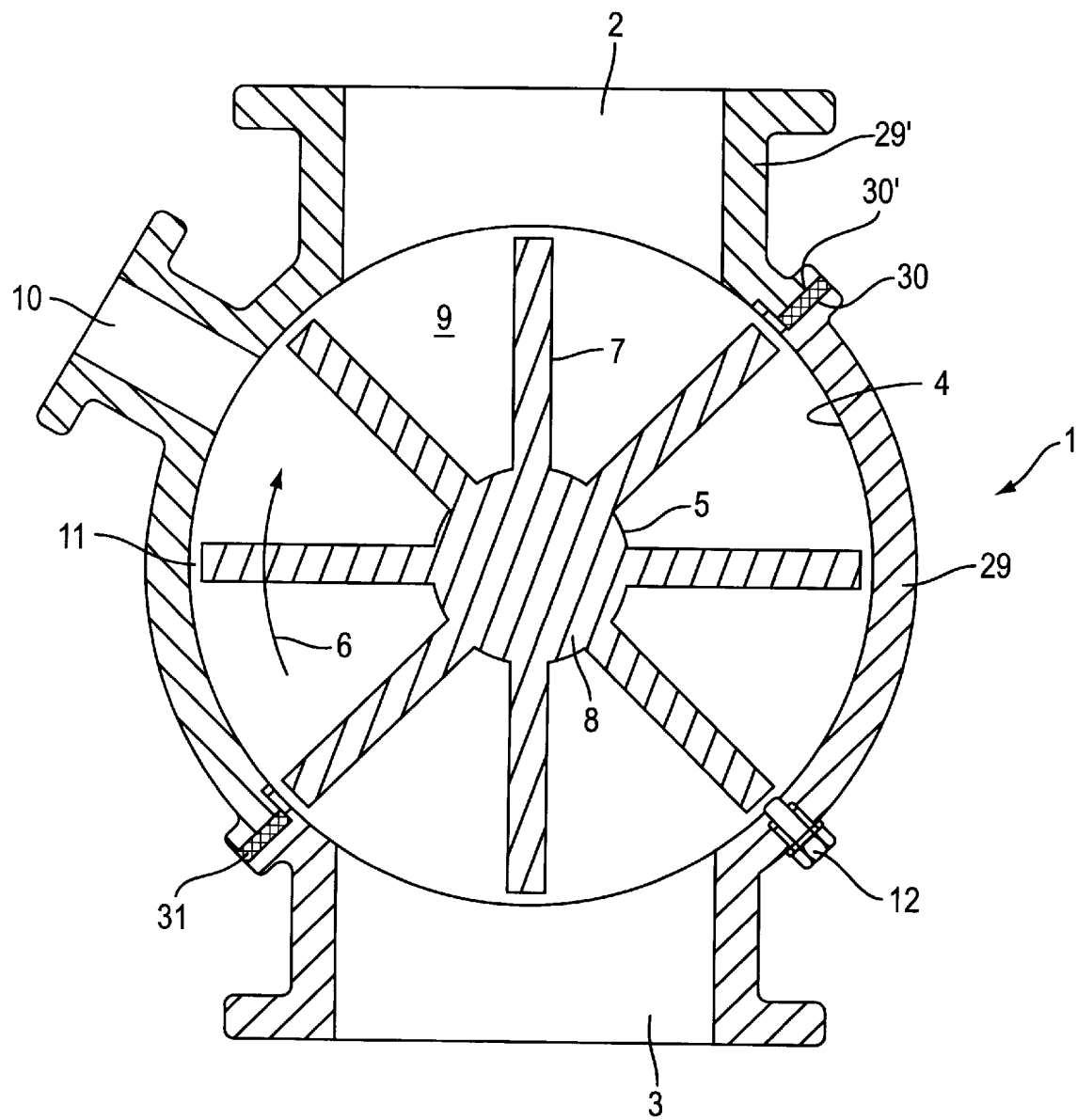
FIG. 4 shows the cross-section of another embodiment in which the housing has an outer wall and an inner wall and at least one deformable element between them.

In the rotary valve according to FIG. 4, the housing 1 is subdivided into two segments 29 and 29' by a diametrical parting line. The segments 29 and 29' are displaceable in circumferential direction relative to each other along parting surfaces 30 and 30' and are spaced from one another by expandable elements 31. The distance between the parting surfaces 30, 30' is defined by the actual expansion of the elements 31, by which the cavity may be enlarged to assume slightly the shape of a slot-hole. The expandable element 31 may be a hydraulic cushion or electric resistors to be heated for expansion when applying a current.

Figure 5:
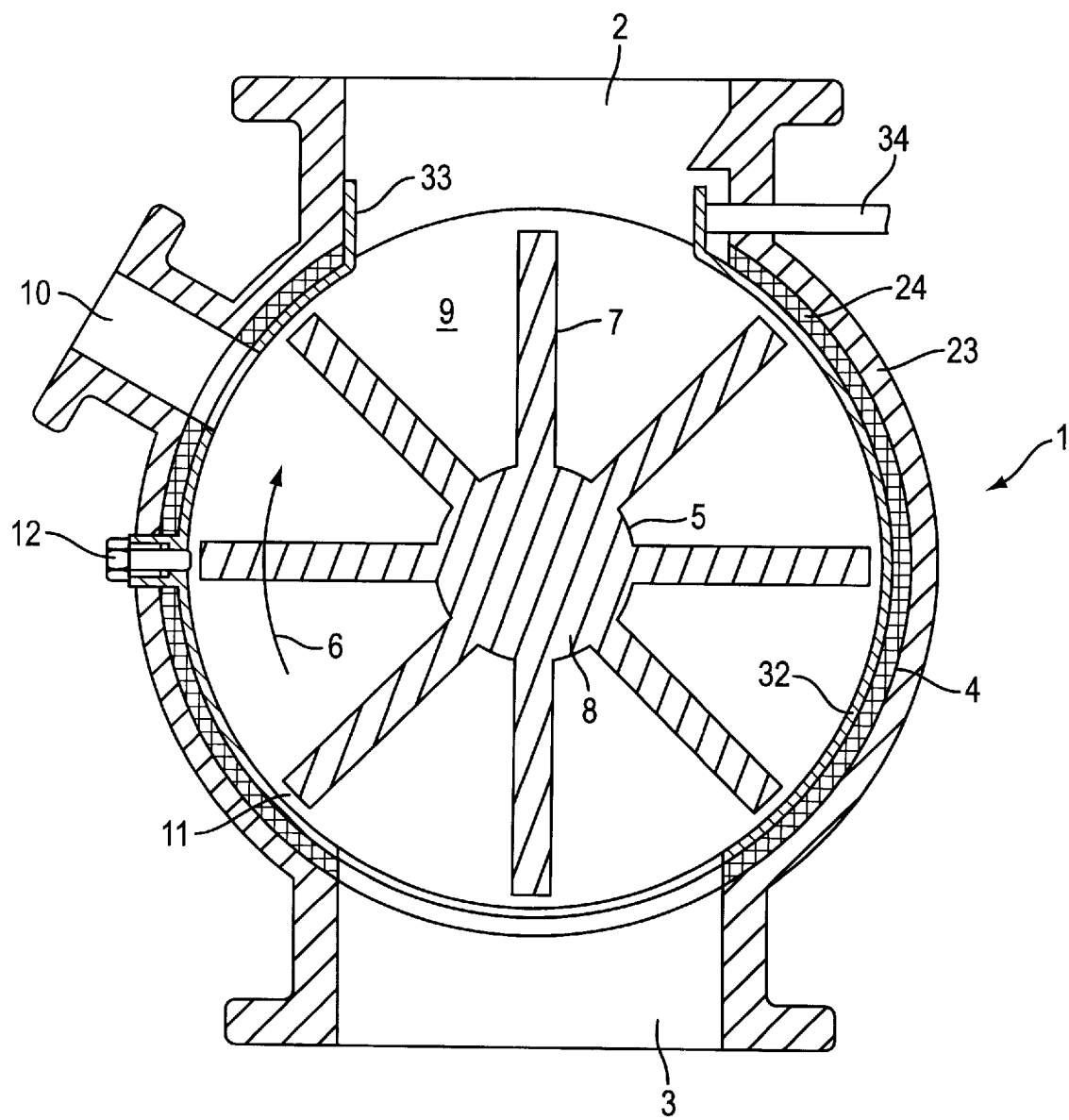
FIG. 5 is a cross-sectional view of yet another embodiment in which the inner wall of the cavity comprises at least one sheet metal whose ends are displaceable in the direction of the circumference of the cavity.

FIG. 5 shows a rotary valve in which the inner wall of the cavity 4 is formed by piece of sheet metal 32 which is spaced from the basic body 23 of the housing 1 by an elastic intermediate layer 24. The angled end 33 of the sheet metal 32 engages the wall of the supply opening 2, while the opposite end 33' can be shifted in circumferential direction towards the end 33 by means of a rod 34 penetrating the wall of the supply opening 2. In this way, the diameter of the cavity is locally changed without deviating it substantially from a circular shape. Of course, it would be possible to arrange a similar rod at the side of the end 33 (the left side of FIG. 5). The sensor 12 is screwed into the sheet metal 32 so that it is carried by it when the sheet metal 32, and thus the inner diameter of the cavity 4, is deformed.

Figure 6:
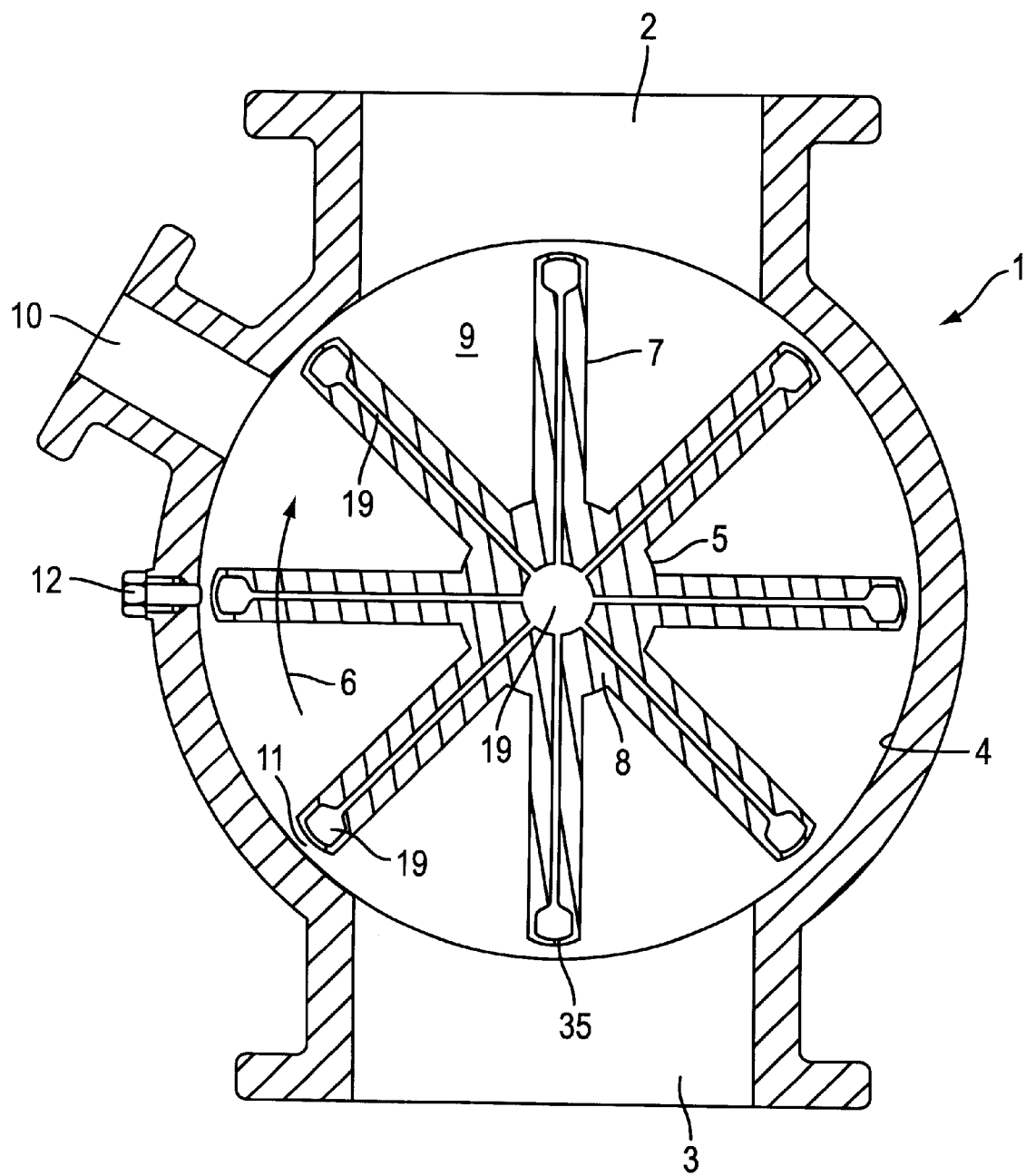
FIG. 6 represents a cross-section of a sixth embodiment including a hollow space in each of the partitions and said inner wall of said cavity into which a pressure medium can be supplied.

In the case of a rotary valve as represented in FIG. 6, the cellular wheel 5 can be deformed in radial direction, while the cavity 4 has an unchangeable diameter. Of course, a combination with any one of the preceding embodiments would also be possible, e.g. in order to maintain the necessary deformations of the cellular wheel and the cavity relative small. In the embodiment according to FIG. 6, the shaft 8 of the rotary valve as well as the partitions 7 comprise hollow spaces into which a fluid can be filled either to be tempered (as in the case of FIG. 1) or to be set under pressure. This latter solution is preferred. The radial outer ends 35 of the partitions 7 are formed each by a membrane so as to bulge out towards the inner wall of the cavity 4 when the inside pressure in the hollow spaces 19 is increased.

Figure 7:
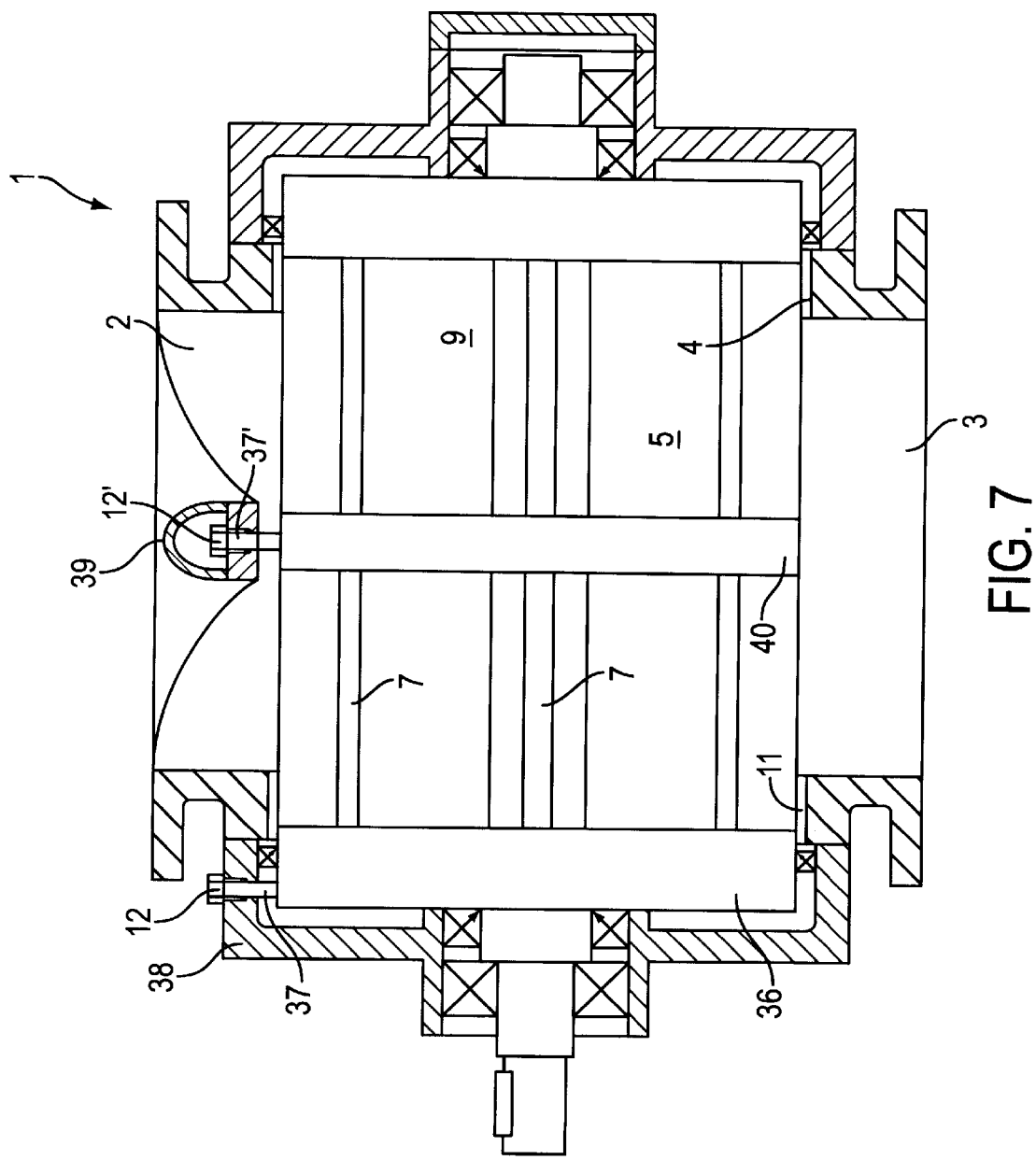
FIG. 7 a rotary valve which realizes measuring the actual value of the radial distance by contacting sensors.

FIG. 7 shows another rotary valve in which measuring the gap between the outer circumference of the cellular wheel and the inner wall of the cavity is not effected by non-contact gauging, but by contact sensors 12 engaging the surface of the cellular wheel. The cellular wheel 5 is laterally defined by front disks 36 whose outer circumference is engaged by a displaceable pin 37 of the sensor 12, the pin being elastically biased against the disk 36, e.g. by a pressure spring. In this way, the distance of the circumference of the disk from the inner wall of the cavity 4 can either be indicated by the length of the pin 37 projecting at the exterior of the housing 1 so that an operator can adjust it manually (e.g. increasing the pressure in the hollow spaces 9, as in FIG. 1) or the pin 37 is connected to a position sensor. For example, it could be surrounded by an induction coil (not shown). Alternatively, the pin 37 could have a screw thread which is digitally sensed by an electromagnet (not shown) as is known for other purposes. The sensor 12 may be screwed into a lateral cover 38 of the housing 1. Alternatively, the sensor 12' can be arranged in a roof-shaped guiding element 39 in the supply opening 2, the pin 37' engaging a ring member 40 which surrounds the partitions 7 in circumferential direction.

It is in the scope of the present invention that the rotary valve may have any shape even deviating from a cylindrical one, such as a conical shape or a ball shape. Moreover, a greater number of sensors 12 or deformable segments forming the cavity 4 or a different number and shape of partitions 7 can be provided. As mentioned above, a rotary valve having a vertical shaft and axis of the cellular wheel could be successfully operated in the manner according to the invention.

It will be appreciate by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A rotary valve for feeding bulk material, comprising:
   housing means having a cavity defined by inner wall means of at least partially circular cross-section along a central axis, and a supply opening leading to said cavity, and a discharge opening, said cavity having first axial and radial dimensions as well as a certain circumferential dimension;
   a cellular wheel supported rotatably about an axis of rotation in said cavity and including
       a plurality of cells distributed around said axis of rotation and defined by partition means arranged on said cellular wheel and extending in radial direction over a predetermined axial width so that said cellular wheel has predetermined second axial and radial dimensions smaller than said first axial and radial dimensions;
   measuring means for determining an actual distance between said predetermined second axial and radial dimensions and said first axial and radial dimensions, and for providing an output signal representative of said actual distance; and
   adapting means for receiving said output signal and for controlling the actual distance to approach a predetermined distance.

2. Rotary valve as claimed in claim 1, wherein said adapting means are formed on said cellular wheel.

3. Rotary valve as claimed in claim 1, wherein said adapting means are formed on the inner wall means of said cavity.

4. Rotary valve as claimed in claim 3, wherein said inner wall means are formed by at least one metal sheet which is deformable under the action of a force applied to it.

5. Rotary valve as claimed in claim 3, wherein said inner wall means are subdivided into at least two partial walls displaceable relative to each other.

6. Rotary valve as claimed in claim 3, wherein said inner wall means comprise at least one sheet metal having two ends displaceable in the direction of said circumferential dimension.

7. Rotary valve as claimed in claim 3, wherein said housing means further comprise outer wall means and at least one deformable element between said outer wall means and said inner wall means.

8. Rotary valve as claimed in claim 1, wherein said adapting means comprise tempering means for controlling said actual distance by temperature dependent expansion and restriction.

9. Rotary valve as claimed in claim 1, wherein said adapting means comprise at least one hollow space in at least one of said partition means and said inner wall of said cavity, and means for pressurizing a medium in said hollow space for deforming at least one of said partition means and said inner wall.

10. Rotary valve as claimed in claim 1, wherein at least part of said partition means and said inner wall have an elastically deformable wall.

11. A method of operating a rotary valve having a cellular wheel of a certain outer radial dimension and being rotatable in a cavity of a housing which has a certain inner radial dimension larger than said outer radial dimension so as to define a radial distance between said cellular wheel and said cavity, the method comprising the steps of:
   determining said radial distance, and
   controlling at least one of said inner and outer radial dimensions based on the determined radial distance.

12. Method as claimed in claim 11, wherein step of controlling involves changing said outer dimension.

13. Method as claimed in claim 11, wherein step of controlling involves changing said inner dimension.

14. A method of operating a rotary valve having a cellular wheel of a certain outer radial dimension and being rotatable in a cavity of a housing which has a certain inner radial dimension larger than said outer radial dimension so as to define a radial distance between said cellular wheel and said cavity, the radial distance being changeable, the method comprising the steps of:
   determining the actual value of said radial distance between said inner and outer radial dimensions;
   comparing said actual value with a predetermined nominal value; and
   controlling at least one of said inner and outer radial dimensions so as to correspond to said nominal value.

15. Method as claimed in claim 14, wherein said step of determining comprises inductively measuring the actual value of said radial distance.

16. Method as claimed in claim 14, wherein said step of determining comprises measuring the actual value of said radial distance by at least one contacting sensor.

* * * * *